US008547965B2

(12) United States Patent
Lu et al.

(10) Patent No.: US 8,547,965 B2
(45) Date of Patent: Oct. 1, 2013

(54) METHODS, APPARATUS AND ARTICLES OF MANUFACTURE TO PROVIDE UNIFORM RESOURCE IDENTIFIER PORTABILITY

(75) Inventors: Min Lu, Freehold, NJ (US); Yi Chin, Freehold, NJ (US); Gerald L. Hoover, Red Bank, NJ (US); Mark Ratcliffe, Oakhurst, NJ (US); Leopold Strahs, Williamsburg, VA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 736 days.

(21) Appl. No.: 12/561,054

(22) Filed: Sep. 16, 2009

(65) Prior Publication Data

US 2011/0064073 A1 Mar. 17, 2011

(51) Int. Cl.
*H04L 12/50* (2006.01)

(52) U.S. Cl.
USPC .......................................... 370/352

(58) Field of Classification Search
USPC ................. 370/260, 261, 270, 271, 400, 401, 370/493, 494, 495, 350–355; 709/277
See application file for complete search history.

(56) References Cited

U.S. PATENT DOCUMENTS

| 7,412,044 | B2 * | 8/2008 | Chavez et al. ........... 379/201.01 |
| 7,417,988 | B1 * | 8/2008 | Tripathi et al. ............... 370/389 |
| 7,525,930 | B2 * | 4/2009 | Fridman et al. ............... 370/259 |
| 7,630,372 | B1 * | 12/2009 | Androski et al. ............. 370/392 |
| 7,860,089 | B2 * | 12/2010 | Tripathi et al. ............... 370/352 |
| 7,936,746 | B2 * | 5/2011 | Michaelis et al. ............ 370/352 |
| 8,014,292 | B1 * | 9/2011 | Breau et al. ................... 370/238 |
| 8,180,032 | B2 * | 5/2012 | Yasrebi et al. ................ 379/189 |
| 8,244,905 | B2 * | 8/2012 | Bhatt et al. .................... 709/234 |
| 8,391,273 | B2 * | 3/2013 | Ku .................................. 370/351 |
| 2003/0007482 | A1 * | 1/2003 | Khello et al. .................. 370/352 |
| 2004/0249951 | A1 * | 12/2004 | Grabelsky et al. ............ 709/227 |
| 2005/0237978 | A1 * | 10/2005 | Segal ............................. 370/331 |
| 2007/0121603 | A1 * | 5/2007 | Clark et al. .................... 370/356 |
| 2008/0130523 | A1 | 6/2008 | Fridman et al. |
| 2008/0159261 | A1 * | 7/2008 | Bessis ............................ 370/352 |
| 2009/0003561 | A1 * | 1/2009 | Patel ........................... 379/93.05 |
| 2009/0040948 | A1 * | 2/2009 | Wengrovitz et al. .......... 370/260 |
| 2009/0059894 | A1 * | 3/2009 | Jackson et al. ................ 370/352 |
| 2009/0075684 | A1 * | 3/2009 | Cheng et al. .................. 455/466 |
| 2009/0225744 | A1 * | 9/2009 | Zerillo .......................... 370/352 |
| 2010/0070525 | A1 * | 3/2010 | Clark et al. .................... 707/769 |
| 2010/0074247 | A1 * | 3/2010 | Clark et al. .................... 370/352 |

(Continued)

OTHER PUBLICATIONS

"URI Portability," discussion thread, Feb. 8, 2006, downloaded from http://www.ietf.org/mail-archive/web/enum/current/msg04689.html (7 pages).

(Continued)

*Primary Examiner* — Asad Nawaz
*Assistant Examiner* — Syed S Ali
(74) *Attorney, Agent, or Firm* — Hanley, Flight & Zimmerman, LLC (57) ABSTRACT

Example methods, apparatus and articles of manufacture to provide uniform resource identifier (URI) portability for communication networks are disclosed. A disclosed example method includes receiving a first communication session initiation message identifying a called party, identifying a URI associated with the called party, querying a global URI database based on the URI to identify a domain name associated with a service provider network based on the URI, and sending a second communication session initiation message including the URI to the service provider network via the domain name.

9 Claims, 5 Drawing Sheets

(56) References Cited

U.S. PATENT DOCUMENTS

| | | | |
|---|---|---|---|
| 2010/0150132 A1* | 6/2010 | Ku | 370/351 |
| 2010/0157977 A1* | 6/2010 | Ku | 370/352 |
| 2010/0226362 A1* | 9/2010 | Kim et al. | 370/352 |
| 2010/0250680 A1* | 9/2010 | Bhatt et al. | 709/206 |

OTHER PUBLICATIONS

Kershaw, "VoIP and Number Portability: Perceived v. Real Problems," Copyright 2004 (24 pages).

* cited by examiner

METHODS, APPARATUS AND ARTICLES OF MANUFACTURE TO PROVIDE UNIFORM RESOURCE IDENTIFIER PORTABILITY

FIELD OF THE DISCLOSURE

This disclosure relates generally to communication networks and, more particularly, to methods, apparatus and articles of manufacture to provide uniform resource identifier (URI) portability for communication networks.

BACKGROUND

In communication networks, such as Internet Protocol (IP) Multimedia Subsystem (IMS) networks, communication sessions are routed through a communication network from an originating device (e.g., a voice over IP (VoIP) telephone, plain old telephone service (POTS) telephone, mobile phone and/or cellular phone) to a terminating device (e.g., a VoIP telephone, a POTS telephone, mobile phone and/or cellular phone). Server-based URIs are widely used in IMS networks to route communication sessions. An example server-based URI is john.doe@serviceprovider.net, where john.doe identifies a particular subscriber and serviceprovider.net identifies the host and/or service provider that provides one or more communication services to john.doe via that server-based URI.

DETAILED DESCRIPTION

Example methods, apparatus and articles of manufacture to provide uniform resource identifier (URI) portability for communication networks are disclosed. A disclosed example method includes receiving a first communication session initiation message identifying a called party, identifying a URI associated with the called party, querying a global URI database based on the URI to identify a domain name associated with a service provider network based on the URI, and sending a second communication session initiation message including the URI to the service provider network via the domain name.

A disclosed example call session control function server (CSCF) of a first Internet Protocol (IP) Multimedia Subsystem (IMS) network includes a client to query a global URI server based on a URI associated with a called party to identify a domain name associated with a second IMS network, and a session initiation protocol (SIP) interface to receive a first SIP INVITE message identifying the called party, and to send a second SIP INVITE message including the called party URI to the second IMS network via the domain name.

A disclosed example apparatus includes a machine accessible memory, an data structure stored on the machine accessible memory, the data structure defining a plurality of service provider domain names for respective ones of a plurality of terminating party uniform resource identifiers, and a database interface to query the data structure to determine at the apparatus a terminating network for a communication session initiation message based on the data structure.

Another disclosed example method includes receiving a query request identifying a URI associated with a terminating party of a communication service initiation request, querying a URI portability database based on the URI to identify a domain name associated with a service provider network, and sending a query response message identifying the domain name.

Figure 1:
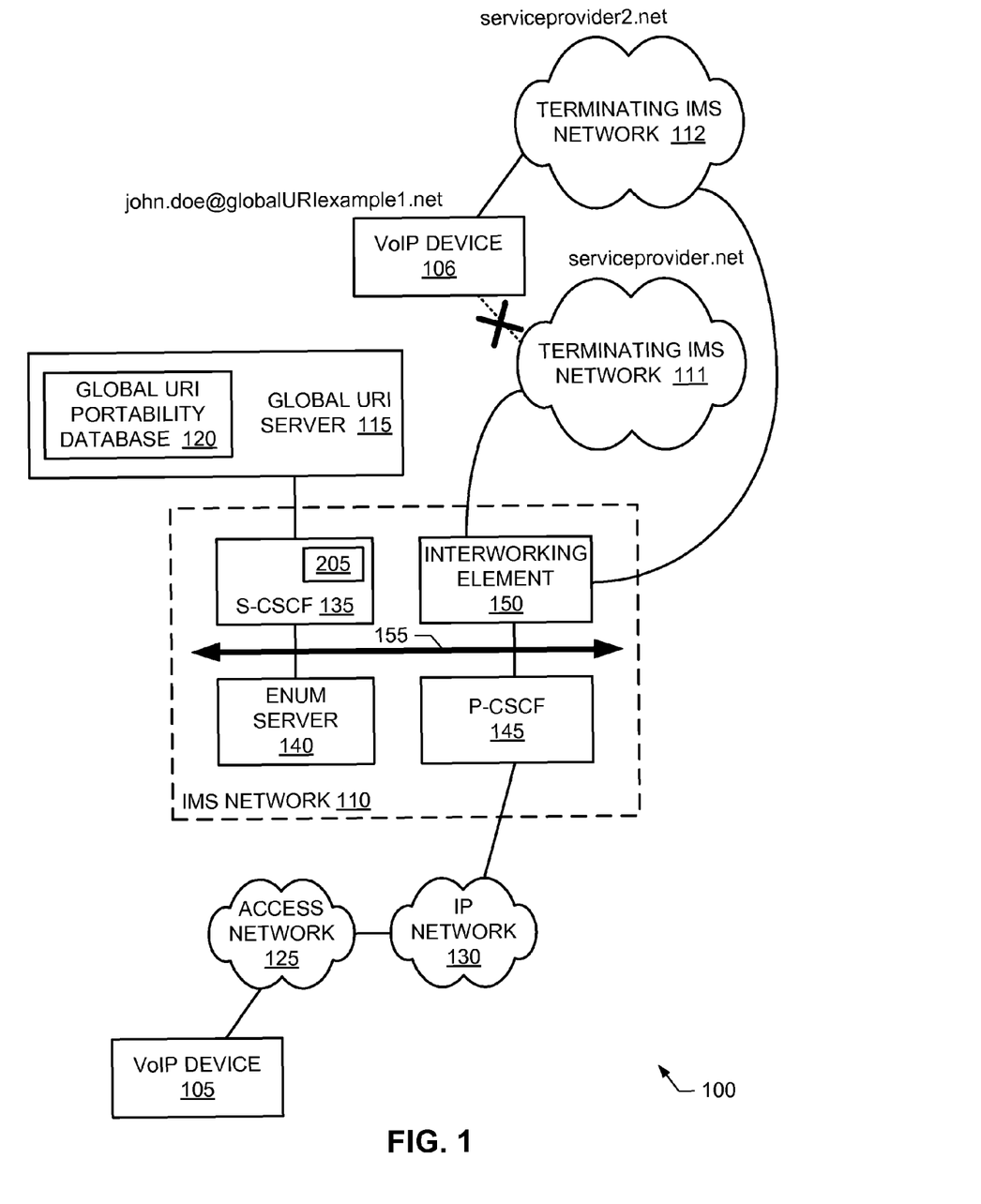
FIG. 1 is a schematic illustration of an example IMS-based communication system constructed in accordance with the teachings of this disclosure.

In the interest of brevity and clarity, throughout the following disclosure references will be made to an example IMS-based communication system 100 implemented using SIP messages and/or SIP-based message exchanges. However, the methods, apparatus and articles of manufacture described herein to provide URI portability are applicable to any number and/or type(s) of additional and/or alternative communication systems and/or networks implemented using any number and/or type(s) of additional and/or alternative devices, servers, network technologies, network topologies and/or network protocols. Moreover, while the examples disclosed herein are described with reference to voice over Internet protocol (VoIP) communication services, the methods, apparatus and articles of manufacture may be used to provide URI portability for any number and/or type(s) of additional and/or alternative communication services, IMS-based or otherwise. Other example communication services include, but are not limited to, Internet services, data services, messaging services, instant messaging services, electronic mail (email) services, chat services, video services, audio services, gaming services, etc.

The example IMS-based communication system 100 of FIG. 1 includes any number and/or type(s) of VoIP user devices, two of which are designated at reference numerals 105 and 106. Example VoIP user devices 105 and 106 include, but are not limited to, an IMS (e.g., VoIP) phone, a VoIP residential gateway, a VoIP enabled personal computer (PC), a VoIP endpoint, a wireless VoIP device (e.g., a wireless-fidelity (WiFi) Internet protocol (IP) phone, a 3G cellular VoIP phone, and/or a 4G Cellular VOIP phone), a VoIP adapter (e.g., an analog telephone adapter (ATA)), a VoIP enabled personal digital assistant (PDA), and/or a VoIP kiosk. The example VoIP devices 105 and 106 of FIG. 1 may be implemented and/or be found at any number and/or type(s) of location(s). Further, the VoIP devices 105 and 106 may be fixed location devices, substantially fixed location devices and/or mobile devices. Further, the VoIP devices 105 and 106 may have equipment communicatively and/or electrically coupled to them. For example, a VoIP ATA may be coupled to a telephone, and/or a VoIP residential gateway may be coupled to a PC and/or set-top box.

To provide communication services to and/or between VoIP devices, such as the example VoIP devices 105 and 106, the example IMS based communication system 100 of FIG. 1 includes any number and/or type(s) of IMS networks, three of which are designated in FIG. 1 with reference numerals 110, 111 and 112. While not shown in FIG. 1, the example IMS networks 111 and 112 can be implemented similarly to the example IMS network 110.

When a communication session (e.g., a telephone call) is initiated from a calling device to a called device, the originating IMS network associated with the calling device needs to identify the terminating IMS network associated with the called device. Traditionally, the terminating IMS network is identified by and/or within a called party URI associated with the called device. An example server-based called party URI as defined by Internet Engineering Task Force (IETF) Request for Comment (RFC) 2396 is john.doe@serviceprovider.net, where john.doe identifies the called device and/or called party (e.g., John Doe) associated with the called device, and serviceprovider.net identifies the terminating IMS network that provides the requested communication service to John Doe via that server-based URI. In such examples, the called party URI represents a fixed association of the called device to that service provider. Thus, when a subscriber changes service providers (as shown in FIG. 1), their associated called party URI has to change. For example, John Doe's URI might change to john.doe@newserviceprovider2.net. Whenever John Doe changes service providers, he must notify other subscribers of his new called party URI in order for them to continue to initiate communication sessions to his device.

To overcome at least these deficiencies, the example communication system 100 of FIG. 1 includes a global URI server 115 that facilitates URI portability for and/or between the example IMS networks 110-112. As described in detail below, the example global URI server 115 of FIG. 1 hosts, contains and/or implements a global URI portability database 120 that associates called and/or terminating party URIs, and/or called and/or terminating device URIs with service provider and/or IMS network host and/or domain names. The example global URI server 115 and the example global URI portability database 120 of FIG. 1 enable the originating IMS network 110 to identify the terminating IMS network 111, 112 associated with a called device 106 based on a global and/or non-service provider specific called and/or terminating device and/or party URI associated with and/or assigned to the called and/or terminating device 106. The VoIP device 106 of FIG. 1 is associated with a global and/or portable URI of john.doe@globalURIexample1.net, where globalURIexample1.net indicates that the URI is not associated with any particular service provider. When the originating IMS network 110 is to initiate a communication service to that global called and/or terminating party URI, the example IMS network 110 queries the global URI server 115 to identify the service provider host and/or domain name (e.g., serviceprovider2.net) associated with the service provider and/or IMS network 112 that is currently providing communication services to the called and/or terminating device 106. As illustrated in FIG. 1, even though John Doe changed service providers from IMS network 111 to IMS network 112, his associated global called and/or terminating party URI (john.doe@globalURIexample1.net) remains the same, only the association of that global URI to a different service provider domain name (serviceprovider2.net rather than serviceprovider.net) within the global URI portability database 120 need change. By resolving the called party's global URI to a terminating IMS network and/or service provider domain name, the example communication system of FIG. 1 provides and/or implements URI portability within the communication system 100, and obviates the need for John Doe to notify other users and/or subscribers whenever he changes service providers. While a single global URI server 115 is illustrated in FIG. 1, the communication system 100 may include any number of geographically distributed, redundant and/or backup global URI servers 115. An example manner of implementing the example global URI server 115 and the example global URI portability database 120 are described below in connection with FIGS. 3 and 4, respectively.

To provide IMS communication services throughout and/or within a site, location, building, geographic area and/or geographic region, the example IMS-based communication system 100 of FIG. 1 includes any number and/or type(s) of access networks, one of which is designated in FIG. 1 with reference number 125. The example access network 125 of FIG. 1 provides and/or facilitates a communicative coupling of the VoIP user device 105 to and/or with the IMS network 110, which provides and/or enables IMS communication services (e.g., telephone services, Internet services, data services, messaging services, instant messaging services, electronic mail (email) services, chat services, video services, audio services, gaming services, voicemail, facsimile services, etc.) to the VoIP device 105. In some examples, a VoIP device 105 may access the IMS network 110 without use of the access network 125. The example access network 125 of FIG. 1 can be implemented using any number and/or type(s) of past, present and/or future standards, specifications, communication devices, networks, technologies and/or systems, such as public switched telephone network (PSTN) systems, public land mobile network (PLMN) systems (e.g., cellular), wireless distribution systems, wired or cable distribution systems, coaxial cable distribution systems, Ultra High Frequency (UHF)/Very High Frequency (VHF) radio frequency systems, satellite or other extra-terrestrial systems, cellular distribution systems, power-line broadcast systems, fiber optic networks, and/or any combinations and/or hybrids of these devices, systems and/or networks. While in the illustrated example of FIG. 1, the example VoIP device 105 is depicted as having an associated access network 125, such a depiction is merely illustrative. For example, a VoIP device 105 may be configured and/or capable to utilize more than one access network 125 at the same and/or different times, a VoIP device 105 may be configured to access the IMS network 110 directly and/or via an IP network 130 without an intervening access network 125, etc.

In the example IMS-based communication system 100 of FIG. 1, the example VoIP device 105 is communicatively coupled to the example IMS network 110 via the example access network 125, and/or any number and/or type(s) of private and/or public IP based communication networks such as, for example, the Internet, one of which is illustrated in FIG. 1 with reference numeral 130. While in the illustrated example of FIG. 1, the example VoIP device 105 is depicted as having an associated IP network 130, such a depiction is merely illustrative. For example, the example VoIP device 105 may be configured and/or capable to utilize more than one IP network 130 at the same and/or different times, etc. In general, the example IP network 130 of FIG. 1 provides and/or facilitates a communicative coupling of the VoIP device 105 to and/or with the IMS network 110.

While not shown in FIG. 1 for clarity of illustration and discussion, the example IMS networks 111 and 112 of FIG. 1 can have any number and/or type(s) of associated access network(s) and/or IP network(s) via which VoIP devices (e.g., the example VoIP device 106) can be communicatively coupled to the IMS networks 111 and 112.

In some examples, the VoIP device 105 is communicatively coupled to the access network 125, the example IP network 130 and/or, more generally, the example IMS network 110 via one or more additional IP-based networks and/or devices (not shown), such as a local area network (LAN), a gateway and/or a router located within a place of business, a school and/or a residence. For instance, the example VoIP device 105 may be coupled to the example access network 125, the example IP network 130, and/or the example IMS network 110 via any type(s) of voice-band modem(s), digital subscriber line (DSL) modem(s), cable modem(s), Ethernet transceiver(s), optical transceiver(s), IP virtual private network (VPN) connection(s), Institute of Electrical and Electronics Engineers (IEEE) 802.11x (a.k.a. WiFi) transceiver(s), IEEE 802.16 (a.k.a. WiMax), wireless local area network (WLAN) access point(s), general packet radio services (GPRS) networks in 3G wireless networks, etc. Further, any or all of the example IMS network 110, the example access network 125, and/or the example IP network 130 of FIG. 1 may extend geographically to include one or more locations near to and/or encompassing one or more of the VoIP device 105. For example, the access network 125 may include a wireless access point (not shown) by which, for example, a WiFi IP phone 105 connects to the IP network 130 and the IMS network 110.

In the example IMS-based communication system 100 of FIG. 1, the example access network 125, the example IP network 130, and the IMS networks 110-112 need not be owned, implemented, and/or operated by a single service provider. For example, the VoIP device 105 may access IMS services provided by the IMS network 110 that is owned, operated and/or implemented by a first service provider via the access network 125, which is owned, operated and/or implemented by a different service provider. Additionally or alternatively, the IMS networks 110-112 may be owned, operated and/or implemented by the same or different service providers. However, any or all of the access network 125, the IMS networks 110-112 and/or the IP network 130 may be operated by the same service provider.

In the illustrated example IMS-based communication system 100 of FIG. 1, each VoIP device (e.g., the example VoIP device 105) that is registered to the example IMS network 110 is associated with and/or assigned to a serving call session control function (S-CSCF) server (one of which are designated in FIG. 1 with reference numeral 135). The example S-CSCF server 135 of FIG. 1 is responsible for handling incoming and/or outgoing IMS (e.g., VoIP) communication sessions (e.g., telephone calls, and/or data and/or video sessions) associated with its registered VoIP devices. An example manner of implementing the example S-CSCF 135 of FIG. 1 is described below in connection with FIG. 2.

While one S-CSCF server 135 is illustrated in FIG. 1, the example IMS network 110 may include any number and/or type(s) of S-CSCF servers, and each such S-CSCF server may support any number and/or type(s) of VoIP devices 105. The example S-CSCF server 135 of FIG. 1 performs session control, maintains session states and/or enables communications with call feature servers (not shown) for its associated and/or registered VoIP devices 105. For instance, when the calling VoIP device 105 initiates, for example, an outgoing telephone call to the example VoIP device 106, a communication session initiation message (e.g., a SIP INVITE message) is routed by the IMS network 110 from the VoIP device 105 to the S-CSCF server 135 associated with the VoIP device 105.

To locate and/or identify the VoIP device and/or endpoint (e.g., the example VoIP device 106) associated with a called telephone number, the example IMS network 110 of FIG. 1 includes any number of ENUM servers, one of which is designated in FIG. 1 with reference numeral 140. Based upon an ENUM query request message received from the example S-CSCF server 135, the example ENUM server 140 of FIG. 1 performs a lookup and/or query in an ENUM database (not shown) that stores associations of called party identifiers (e.g., E.164 telephone numbers) to one or more called party URIs. However, the ENUM database may store any number and/or type(s) of associations between any number and/or type(s) of identifiers.

In response to a communication session initiation message (e.g., a SIP INVITE message) including a called telephone number (e.g., in a Tel URI format as described in IETF RFC 3966 and/or or in SIP URI representation of a Tel URI format), the example S-CSCF server 135 of FIG. 1 sends an ENUM query request message to the example ENUM server 140 to obtain the called and/or terminating party URI associated with the called telephone number. The URI obtained from the example ENUM server 140 is used by the S-CSCF server 135 to establish the requested communication session to the called device. In response to a communication session initiating message including a called party SIP URI, the example S-CSCF server 135 need not query the example ENUM server 140.

When the called and/or terminating party's URI (e.g., john.doe@serviceprovider.net) obtained either from the ENUM server 140 or from the communication session initiation request message includes, specifies and/or identifies a domain name associated with a particular service provider and/or terminating IMS network 111, 112 for the called device, the example S-CSCF server 135 of FIG. 1 establishes the requested communication session via the service provider and/or terminating IMS network 111, 112 identified in the called party's URI.

When the called party's URI (e.g., john.doe@globalURIexample1.net) includes a domain name that is not specific to any service provider and/or terminating IMS network 111, 112, a global URI client 205 (FIG. 2) of the example S-CSCF server 135 obtains a service provider domain name for the current service provider and/or terminating IMS network 111, 112 associated with the called party URI by querying the example global URI server 115. The example S-CSCF server 135 establishes the requested communication session via the service provider domain name obtained from the global URI server 115.

In some examples, the S-CSCF server 135 compares the domain name contained in a called party's URI with a list of domain names associated with global and/or portable URIs. When the domain name contained in a called party's URI is included in this list, the S-CSCF server 135 queries the global URI server 115 to obtain the service provider domain name. Additionally or alternatively, the S-CSCF server 135 queries the global URI server 115 for each called party URI. If the called party URI is a global and/or portable URI, the global-URI server 115 returns the domain name of the terminating service provider. If the called party URI is not a global and/or portable URI, the global-URI server 115 returns the domain name contained in the called party URI. Alternatively, the global-URI server 115 can return a flag indicating that the S-CSCF server 135 should handle the requested communication session to the called party URI in accordance with any past, present and/or future communication session initiation protocol.

Upon receipt of a communication session initiation message directed to a global and/or portable URI, the example terminating IMS networks 111 and 112 maps the received global and/or portable URI to a URI and/or device identifier associated with the called VoIP device 106.

To provide an access entry point for a VoIP device (e.g., the example VoIP device 105) into the IMS network 110, the example IMS network 110 of FIG. 1 includes any number and/or type(s) of proxy call session control function (P-CSCF) servers, one of which is designated in FIG. 1 with reference numeral 145. The example P-CSCF server 145 of FIG. 1, among other things, routes SIP messages between VoIP devices and their associated S-CSCF server 135.

To facilitate communication between devices (e.g., the example VoIP device 105) of the example IMS network 110 and devices of other communication networks, such as the example IMS networks 111 and 112, a public land mobile network (PLMN) (e.g., a cellular communication network), a public switched telephone network (PSTN), etc., the example IMS network 110 includes any number and/or type(s) of gateway(s), border element(s), and/or interworking elements, one of which is designated at reference numeral 150. When a called party is associated with a device 106 that is not associated with the IMS network 110 (e.g., a PSTN device, a PLMN device and/or a VoIP device served by a different IMS and/or VoIP network), data and/or protocol messages directed to the destination are routed via the example interworking element 150. While a single interworking element 150 is illustrated in FIG. 1, it will be understood that any number and/or type(s) of interworking elements 150 may be implemented by the example IMS network 110 to facilitate communication between the IMS network 110 and any number and/or type(s) of other communication networks. Example interworking elements 150 include, but are not limited to, a media gateway and/or a peered border element.

As illustrated in FIG. 1, the example S-CSCF server 135, the example ENUM server 140, the example P-SCSCF server 145, and/or the example interworking element 150 communicate and/or are communicatively coupled via any number, type(s) and/or combination of communication paths, communication networks, busses and/or communication devices 155.

While an example IMS-based VoIP communication system 100 and an example IMS network 110 have been illustrated in FIG. 1, the devices, networks, systems, servers and/or processors illustrated in FIG. 1 may be combined, divided, re-arranged, eliminated and/or implemented in any way. For example, it will be readily appreciated by persons of ordinary skill in the art that the example global URI server 115, the example global URI portability database 120, the example S-CSCF server 135, the example global URI client 205, the example ENUM server 140, the example P-SCSCF server 145, and/or the example interworking element 150 illustrated in FIG. 1 are logical entities of the example IMS network 110. They may, therefore, be implemented separately and/or in any combination using, for example, machine accessible instructions executed by one or more computing devices and/or computing platforms (e.g., the example processing platform P100 of FIG. 7). Further, the example VoIP devices 105 and 106, the example global URI server 115, the example global URI portability database 120, the example S-CSCF server 135, the example global URI client 205, the example ENUM server 140, the example P-SCSCF server 145, the example interworking element 150 and/or, more generally, the example IMS network 110 may be implemented by hardware, software, firmware and/or any combination of hardware, software and/or firmware. Thus, for example, any of the example VoIP devices 105 and 106, the example global URI server 115, the example global URI portability database 120, the example S-CSCF server 135, the example global URI client 205, the example ENUM server 140, the example P-SCSCF server 145, the example interworking element 150 and/or, more generally, the example IMS network 110 may be implemented by one or more circuit(s), programmable processor(s), application specific integrated circuit(s) (ASIC(s)), programmable logic device(s) (PLD(s)) and/or field programmable logic device(s) (FPLD(s)), etc. Further still, the example IMS-based VoIP communication system 100 and/or the example IMS network 110 may include additional devices, servers, systems, networks, gateways, portals, and/or processors in addition to, or instead of, those illustrated in FIG. 1, and/or may include more than one of any or all of the illustrated devices, servers, networks, systems, gateways, portals, and/or processors. For example, an IMS network 110 may include any number and/or type(s) of interrogating call session control function (I-CSCF) servers, home subscriber server(s) (HSSs), media gateways, media gateway control function (MGCF) servers, breakout gateway control function (BGCF) severs, soft switches, feature servers, application servers, and/or session border controllers.

Figure 2:
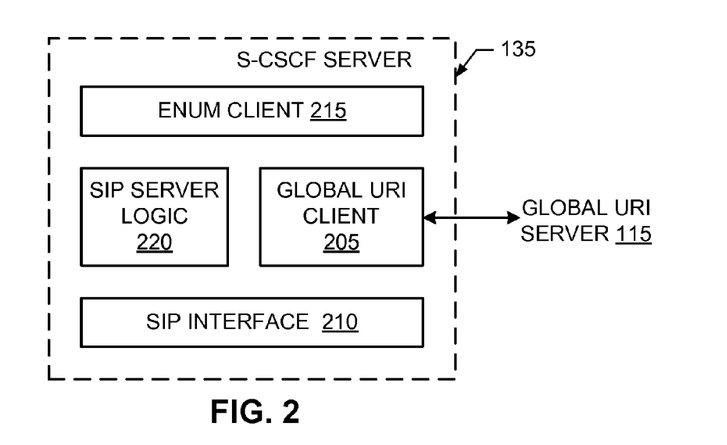
FIG. 2 illustrates an example manner of implementing the example serving call session control function (S-CSCF) server of FIG. 1.

FIG. 2 illustrates an example manner of implementing the example S-CSCF server 135 of FIG. 1. To allow the example S-CSCF server 135 of FIG. 2 to receive and/or send SIP messages, the example S-CSCF server 135 includes any type of SIP interface 210. The example SIP interface 210 of FIG. 2 allows the example S-CSCF server 135 to exchange one or more SIP messages with one or more other devices such as a VoIP device, a border element, a content server, a feature server, an I-CSCF server, an HSS, and/or any other call server.

To interact with an ENUM server (e.g., the example ENUM server 140 of FIG. 1), the example S-CSCF server 135 of FIG. 2 includes an ENUM client 215. The example ENUM client 215 of FIG. 2 is used to send an ENUM query message to an ENUM server and/or to receive an ENUM query response message from the ENUM server. An example ENUM client 215 is implemented in accordance with Internet Engineering Task Force (IETF) Request for Comment (RFC) 3761.

To process and/or handle SIP messages, the example S-CSCF 135 of FIG. 2 includes SIP server logic 220. The example SIP server logic 220 of FIG. 2 implements a state engine and/or maintains state information for SIP transactions, dialogs, and/or communication sessions including, for example, handling registrations and/or handling incoming/outgoing calls as defined in Internet Engineering Task Force (IETF) Request for Comment (RFC) 3261. For example, when a communication session request is received from a calling party at the S-CSCF 135, the example SIP server logic 220 of FIG. 2 can perform an ENUM lookup for a called telephone number by sending an ENUM query message to an ENUM server (e.g., the example ENUM server 125 of FIG. 1) via the example ENUM client 215 to obtain an associated called and/or terminating party URI.

To obtain a service provider domain name associated with a global and/or portable called and/or terminating party URI, the example S-CSCF server 135 of FIG. 2 includes the example global URI client 205. When a global and/or portable called party URI is obtained via the ENUM client 215 and/or is identified in a communication session initiation request message by the SIP server logic 220, the example SIP server logic 220 of FIG. 2 performs a global URI lookup to identify and/or obtain a service provider domain name associated with the called party URI by sending URI query request message to the example global URI server 115 via the example global URI client 205.

When the host name of the identified and/or obtained called and/or terminating party's URI (e.g., serviceprovider-.net in a called party URI of john.doe@serviceprovider.net) specifies and/or identifies does not belong to a registered global URI host, the example SIP server logic 220 of FIG. 2 establishes the requested communication session via the service provider and/or terminating IMS network 111, 112 host and/or domain name identified in the called party's URI.

When the host name of identified and/or obtained the called and/or terminating party's URI (e.g., globalURIexample1.net in a called party URI of john.doe@globalURIexample1.net) belongs to a registered global URI host, the example SIP server logic 220 of FIG. 2 obtains a service provider domain name for the called party URI via the global URI client 205, and establishes the requested communication session via the thus obtained service provider URI.

In some examples, the global URI client 205 compares the domain name contained in a called party's URI with a list of domain names associated with global and/or portable URIs. When the domain name contained in a called party's URI is included in this list, the global URI client 205 queries the global URI server 115 to obtain the service provider domain name. Additionally or alternatively, the global URI client 205 queries the global URI server 115 for each called party URI. If the called party URI is a global and/or portable URI, the global-URI server 115 returns the domain name of the terminating service provider. If the called party URI is not a global and/or portable URI, the global-URI server 115 returns the domain name contained in the called party URI. Alternatively, the global-URI server 115 can return a flag indicating that the SIP server logic 220 should handle the requested communication session to the called party URI in accordance with any past, present and/or future communication session initiation protocol.

While an example manner of implementing the example S-CSCF 135 of FIG. 1 has been illustrated in FIG. 2, one or more of the interfaces, modules, elements and/or devices illustrated in FIG. 2 may be combined, divided, re-arranged, omitted, eliminated and/or implemented in any other way. Further, the example global URI client 205, the example SIP interface 210, the example ENUM client 215, the example SIP server logic 220 and/or, more generally, the example S-CSCF 135 of FIG. 2 may be implemented by hardware, software, firmware and/or any combination of hardware, software and/or firmware. Thus, for example, any of the example global URI client 205, the example SIP interface 210, the example ENUM client 215, the example SIP server logic 220 and/or, more generally, the example S-CSCF 135 may be implemented by one or more circuit(s), programmable processor(s), ASIC(s), PLD(s) and/or FPLD(s), etc. Further still, the S-CSCF 135 may include interfaces, modules, elements and/or devices instead of, or in addition to, those illustrated in FIG. 2 and/or may include more than one of any or all of the illustrated interfaces, modules, elements and/or devices.

Figure 3:
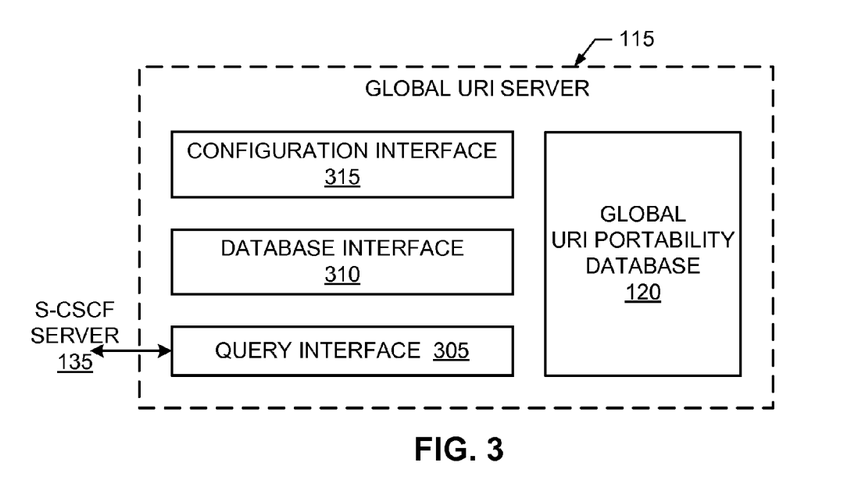
FIG. 3 illustrates an example manner of implementing the example global URI server of FIG. 1.

FIG. 3 illustrates an example manner of implementing the example global URI server 115 of FIG. 1. To allow the example global URI server 115 of FIG. 3 to receive and/or send URI query messages, the example global URI server 115 includes any type of query interface 305. The example query interface 305 of FIG. 3 allows the example global URI server 115 receive requests to query the example global URI portability database 120 and to send query result messages.

To search and/or query the global URI portability database 120, the example global URI server 115 includes a database interface 310. When a database query request is received via the example query interface 305, the example database interface 310 of FIG. 3 queries the database 120 to identify the database record associated with the called a terminating party URI contained, specified and/or identified in the received request. The example database interface 310 returns to the query interface 305 the service provider domain name contained in the identified database record.

In some examples, global URI server 115 may receive queries regarding both global or portable URIs, and non-global or non-portable URIs. When a particular called party URI is found in the global URI portability database 120, the global-URI server 115 returns the domain name of the terminating service provider. When a particular called party URI is not found in the global URI portability database 120, the global-URI server 115 can return the domain name contained in the called party URI or a flag indicating that the called party URI was not found in the global URI portability database 120.

To allow a user, technician, customer service representative, service provider, etc. to associate, define, specify, enter and/or otherwise provide a service provider domain name for a called and/or terminating party URI, the example global URI server 115 includes any number and/or type(s) of configuration interfaces, one of which is designated at reference numeral 315. Example configuration interfaces 315 include, but are not limited to, a web server, an application programming interface, an interactive voice response system, etc.

While an example manner of implementing the example global URI server 115 of FIG. 1 has been illustrated in FIG. 3, one or more of the interfaces, modules, elements and/or devices illustrated in FIG. 3 may be combined, divided, re-arranged, omitted, eliminated and/or implemented in any other way. Further, the example query interface 305, the example database interface 310, the example configuration interface 315, the example global URI portability database 120 and/or, more generally, the example global URI server 115 of FIG. 3 may be implemented by hardware, software, firmware and/or any combination of hardware, software and/or firmware. Thus, for example, any of the example query interface 305, the example database interface 310, the example configuration interface 315, the example global URI portability database 120 and/or, more generally, the example global URI server 115 may be implemented by one or more circuit(s), programmable processor(s), ASIC(s), PLD(s) and/or FPLD(s), etc. Further still, the global URI server 115 may include interfaces, modules, elements and/or devices instead of, or in addition to, those illustrated in FIG. 3 and/or may include more than one of any or all of the illustrated interfaces, modules, elements and/or devices.

Figure 4:
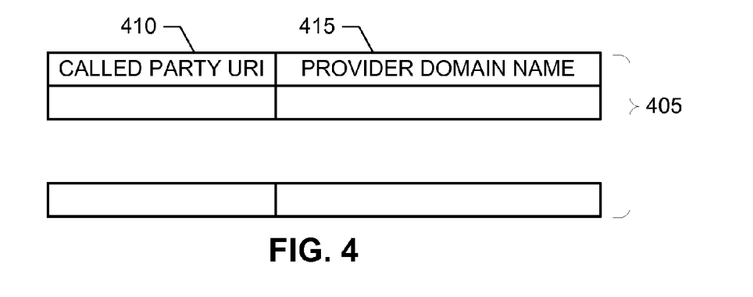
FIG. 4 illustrates an example database that may be used to implement the example global URI database of FIG. 1.

FIG. 4 illustrates an example data structure that may be used to implement the example global URI portability database 120 of FIGS. 1 and 3. The example data structure of FIG. 4 includes a plurality of entries and/or database records 405 for respective ones of a plurality of called and/or terminating party URIs. To identify called and/or terminating parties each of the example entries and/or database records 405 of FIG. 4 includes a called party URI field 410. Each of the example called party URI fields 410 of FIG. 4 contains one or more alphanumeric characters that represent a URI (e.g., john.doe@globalURIexample1.net) assigned to and/or associated with a called and/or terminating party, and/or called and/or terminating device. A database record 405 corresponding to a called and/or terminating device may be identified by comparing a called party URI received in a URI query request message with the contents of the called party URI fields 410.

To store a service provider domain associated with a called destination, each of the example entries 405 of FIG. 4 includes a provider domain name field 415. Each of the example provider domain name fields 415 of FIG. 4 contains one or more alphanumeric characters that represent a domain name (e.g., newserviceprovider.net) associated with a particular service provider and/or IMS network 111, 112.

While an example data structure that may be used to implement the example global URI portability database 120 of FIGS. 1 and 2 is illustrated in FIG. 4, the example data structure of FIG. 4 may be implemented using any number and/or type(s) of other and/or additional entries, fields and/or data. Further, the entries, fields and/or data illustrated in FIG. 4 may be combined, divided, re-arranged, eliminated and/or implemented in any way. Moreover, the example data structure may include additional entries, fields and/or data than those illustrated in FIG. 4 and/or may include more than one of any or all of the illustrated entries, fields and/or data.

Figure 5:
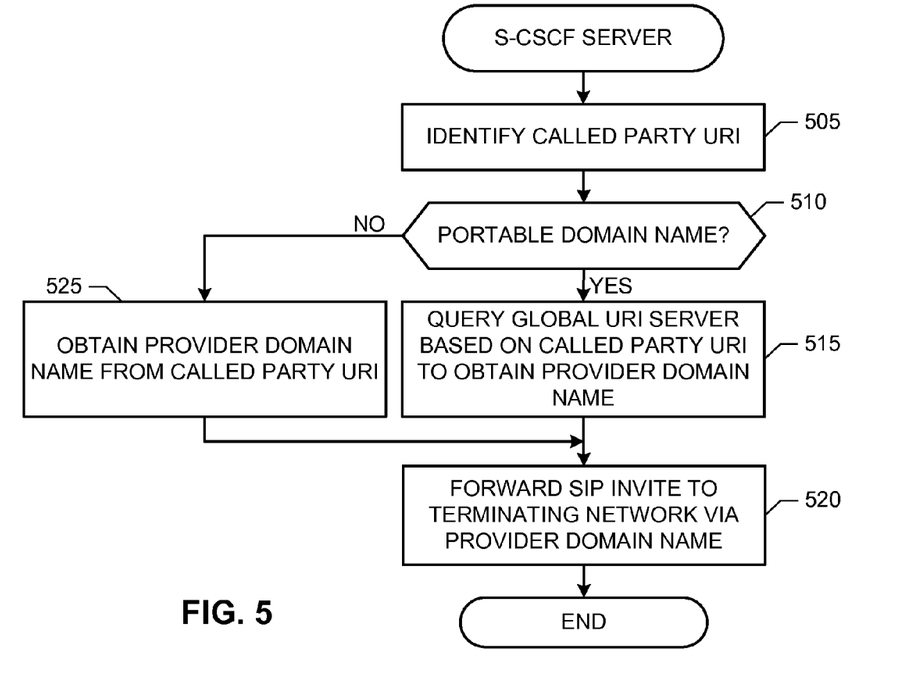
FIG. 5 is a flowchart representative of an example process that may be carried out to implement the example S-CSCF servers of FIGS. 1 and 2.
Figure 6:
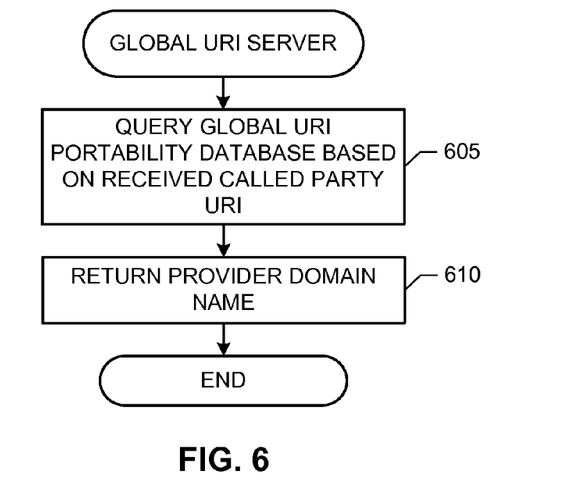
FIG. 6 is a flowchart representative of an example process that may be carried out to implement the example global URI servers of FIGS. 1 and 3.
Figure 7:
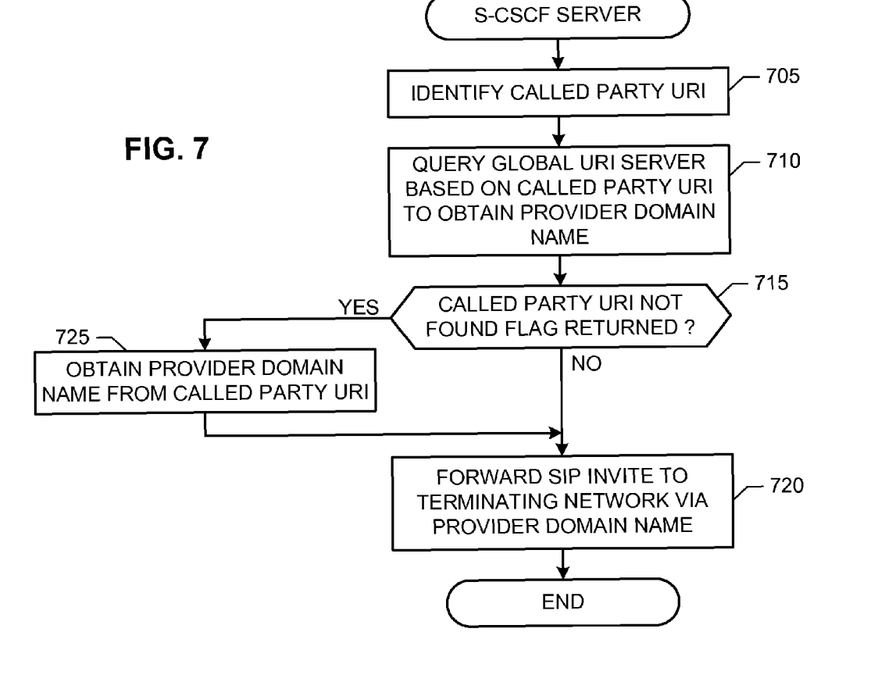
FIG. 7 is a flowchart representative of another example process that may be carried out to implement the example S-CSCF servers of FIGS. 1 and 2.
Figure 8:
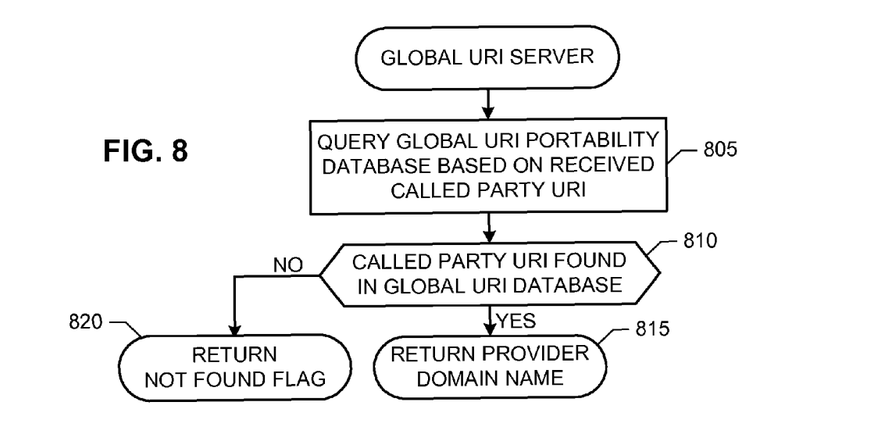
FIG. 8 is a flowchart representative of another example process that may be carried out to implement the example global URI servers of FIGS. 1 and 3.

FIGS. 5 and 7 are flowcharts representative of example processes that may be carried out to implement the example S-CSCF 135 of FIGS. 1 and 2. FIGS. 6 and 8 are flowcharts representative of example processes that may be carried out to implement the example global URI server 115 of FIGS. 1 and 3. The example processes of FIGS. 5-8 may be carried out by a processor, a controller and/or any other suitable processing device. For example, the processes of FIGS. 5-8 may be embodied in coded instructions stored on any article of manufacture, such as any tangible computer-readable medium. Example tangible computer-readable medium include, but are not limited to, a flash memory, a compact disc (CD), a digital versatile disc (DVD), a floppy disk, a read-only memory (ROM), a random-access memory (RAM), a programmable ROM (PROM), an electronically-programmable ROM (EPROM), and/or an electronically-erasable PROM (EEPROM), an optical storage disk, an optical storage device, magnetic storage disk, a magnetic storage device, and/or any other medium which can be used to carry or store program code and/or instructions in the form of machine-accessible instructions or data structures, and which can be electronically accessed by a processor, a general-purpose or special-purpose computer, or other machine with a processor (e.g., the example processor platform P100 discussed below in connection with FIG. 9). Combinations of the above are also included within the scope of computer-readable media. Machine-accessible instructions comprise, for example, instructions and/or data that cause a processor, a general-purpose computer, special-purpose computer, or a special-purpose processing machine to implement one or more particular processes. Alternatively, some or all of the example processes of FIGS. 5-8 may be implemented using any combination(s) of ASIC(s), PLD(s), FPLD(s), discrete logic, hardware, firmware, etc. Also, some or all of the example processes of FIGS. 5-8 may instead be implemented manually or as any combination of any of the foregoing techniques, for example, any combination of firmware, software, discrete logic and/or hardware. Further, many other methods of implementing the example operations of FIGS. 5-8 may be employed. For example, the order of execution of the blocks may be changed, and/or one or more of the blocks described may be changed, eliminated, sub-divided, or combined. Additionally, any or all of the example processes of FIGS. 5-8 may be carried out sequentially and/or carried out in parallel by, for example, separate processing threads, processors, devices, discrete logic, circuits, etc.

The example process of FIG. 5 begins when the example S-CSCF server 135 receives a communication session initiation request message (e.g., a SIP INVITE message) via the example SIP interface 210 from a calling VoIP device 105. After the example SIP server logic 220 completes any originating processing for the calling party, the SIP server logic 220 identifies a called and/or terminating party URI by either obtaining the called and/or terminating party URI from within the received message or performing an ENUM database query via the example ENUM client 215 (block 505).

If the thus identified called and/or terminating party URI is global and/or portable (block 510), the SIP server logic 220 identifies and/or obtains a service provider domain name by querying the example global URI server 115 via the example global URI client 205 (block 515). The SIP server logic 220 forwards and/or sends a SIP INVITE message to the called and/or terminating destination via the obtained service provider domain name (block 520), and control exits from the example process of FIG. 5.

Returning to block 510, if the identified called party URI is not a global or portable URI (block 510), the SIP server logic 220 identifies and/or obtains the service provider domain name from within the called and/or terminating party URI (block 525), and control proceeds to block 520.

The example process of FIG. 6 begins when the example query interface 305 receives a URI query request. Based on the called and/or terminating party URI obtained in the received query request, the example database interface 310 queries the global URI portability database 120 to identify the database record 405 (FIG. 4) associated with called and/or terminating party URI (block 605). The query interface 305 returns the service provider domain name 415 contained in the identified database record 405 (block 610). Control then exits from the example process of FIG. 6.

The example process of FIG. 7 begins when the example S-CSCF server 135 receives a communication session initiation request message (e.g., a SIP INVITE message) via the example SIP interface 210 from a calling VoIP device 105. After the example SIP server logic 220 completes any originating processing for the calling party, the SIP server logic 220 identifies a called and/or terminating party URI by either obtaining the called and/or terminating party URI from within the received message or performing an ENUM database query via the example ENUM client 215 (block 705).

The example global URI client 205 queries the global URI server 115 to obtain a service provider domain name (block 710). If the global URI server 115 returns a service provider domain name (block 715), the SIP server logic 220 forwards and/or sends a SIP INVITE message to the called and/or terminating destination via the returned service provider domain name (block 720). Control then exits from the example process of FIG. 7

Returning to block 715, if the response from the global URI server 115 indicates that the called party URI was not found in the global URI database 120 (block 715), the SIP server logic 220 identifies and/or obtains the service provider domain name from within the called and/or terminating party URI (block 725), and control proceeds to block 720.

The example process of FIG. 8 begins when the example query interface 305 receives a URI query request. Based on the called and/or terminating party URI obtained in the received query request, the example database interface 310 queries the global URI portability database 120 to identify the database record 405 (FIG. 4) associated with called and/or terminating party URI (block 805). If the called and/or terminating party URI is found in the database 120 (block 810), the identified service provider domain name is returned (block 815). If the called and/or terminating party URI is not found in the database 120 (block 810), a flag indicating the called party URI not found in the database 120 is returned (block 820).

Figure 9:
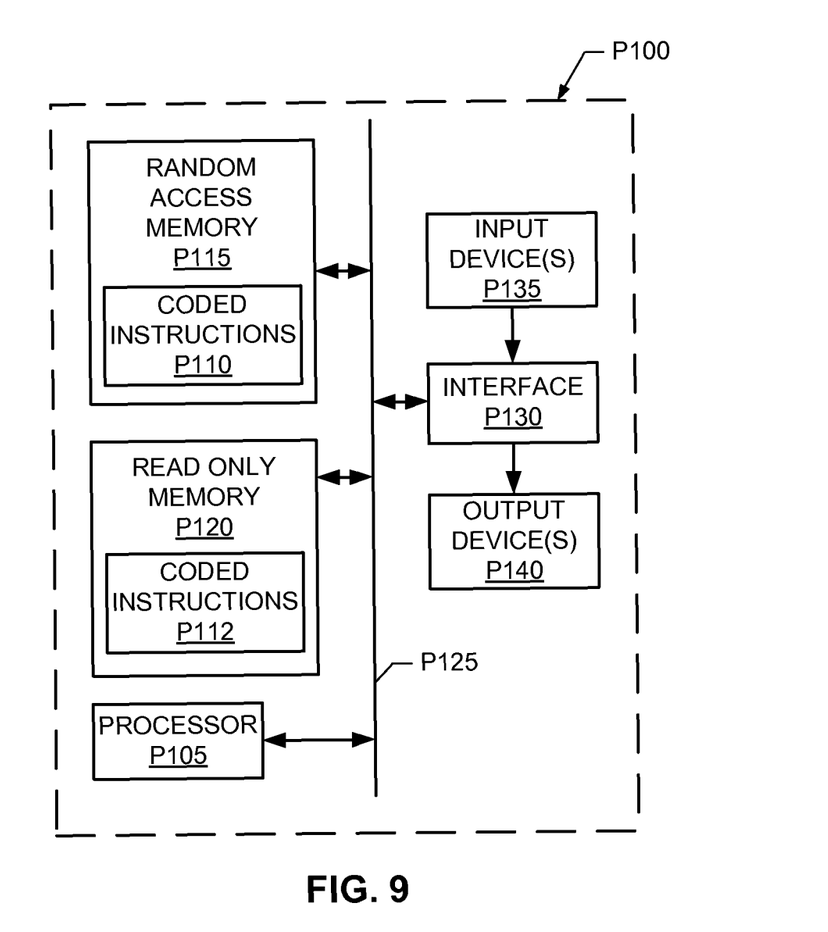
FIG. 9 is a schematic illustration of an example processor platform that may be used and/or programmed to carry out the example processes of FIGS. 5-8, and/or to implement any of all of the methods, apparatus and articles of manufacture disclosed herein.

FIG. 9 is a schematic diagram of an example processor platform P100 that may be used and/or programmed to implement the example S-CSCF 135 of FIGS. 1 and 2, and/or the example global URI servers 115 of FIGS. 1 and 3. For example, the processor platform P100 can be implemented by one or more general-purpose processors, processor cores, microcontrollers, etc.

The processor platform P100 of the example of FIG. 9 includes at least one general purpose programmable processor P105. The processor P105 executes coded and/or machine-accessible instructions P110 and/or P112 stored in main memory of the processor P105 (e.g., within a RAM P115 and/or a ROM P120). The processor P105 may be any type of processing unit, such as a processor core, a processor and/or a microcontroller. The processor P105 may execute, among other things, the example processes of FIGS. 5-8 to implement the example methods, apparatus and articles of manufacture described herein.

The processor P105 is in communication with the main memory (including a ROM P120 and/or the RAM P115) via a bus P125. The RAM P115 may be implemented by DRAM, SDRAM, and/or any other type of RAM device, and ROM may be implemented by flash memory and/or any other desired type of memory device. Access to the memory P115 and the memory P120 may be controlled by a memory controller (not shown). The example memory P115 and/or P120 may be used to, for example, implement and/or store the example global URI portability database 120 of FIGS. 1 and 3.

The processor platform P100 also includes an interface circuit P125. The interface circuit P125 may be implemented by any type of interface standard, such as an external memory interface, serial port, general-purpose input/output, etc. One or more input devices P130 and one or more output devices P130 are connected to the interface circuit P125. The input devices P130 and/or output devices P130 may be used to, for example, implement the example global URI client 205, the example SIP interface 210, the example ENUM client 215, the example query interface 305, the example database interface 310, and/or the example configuration interface 315 of FIGS. 1-3.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method comprising:
   identifying a uniform resource identifier associated with a called party, the called party being identified in a received first communication session initiation message, wherein identifying the uniform resource identifier comprises extracting a telephone number from the first communication session initiation message and querying a telephone number mapping database based on the telephone number to obtain the uniform resource identifier;
   identifying a domain name of the uniform resource identifier;
   when the domain name of the uniform resource identifier corresponds to a global identity service and does not specify a service provider network, querying a global uniform resource identifier database based on the uniform resource identifier to identify a first service provider network of the called party according to the global identity service, wherein querying the global uniform resource identifier database comprises sending a query identifying the uniform resource identifier to a global uniform resource identifier server and receiving a response from the global uniform resource identifier server identifying the service provider network; and
   sending a second communication session initiation message including the uniform resource identifier to the first service provider network.

2. A method as defined in claim 1, wherein identifying the uniform resource identifier comprises extracting the uniform resource identifier from the first communication session initiation message.

3. A method as defined in claim 1, wherein the first communication session initiation message comprises at least one of a session initiation protocol message, a session initiation protocol INVITE message, a session initiation protocol OPTIONS message, a session initiation protocol REGISTER message, a session initiation protocol ACK message, a session initiation protocol CANCEL message, or a session initiation protocol BYE message.

4. A method as defined in claim 1, further comprising:
   comparing the domain name to a list of domain names associated with the global identity service to determine whether the uniform resource identifier is directed to the global identity service.

5. A tangible machine-readable storage device comprising instructions that, when executed, cause a machine to perform a method comprising:
   identifying a uniform resource identifier associated with a called party, the called party being identified in a received first communication session initiation message, wherein identifying the uniform resource identifier comprises extracting a telephone number from the first communication session initiation message and querying a telephone number mapping database based on the telephone number to obtain the uniform resource identifier;
   identifying a domain name of the uniform resource identifier;
   when the domain name of the uniform resource identifier corresponds to a global identity service and does not specify a service provider network, querying a global uniform resource identifier database based on the uniform resource identifier to identify a first service provider network of the called party according to the global identity service, wherein querying the global uniform resource identifier database comprises sending a query identifying the uniform resource identifier to a global uniform resource identifier server and receiving a response from the global uniform resource identifier server identifying the service provider network; and
   sending a second communication session initiation message including the uniform resource identifier to the first service provider network.

6. A storage medium device as defined in claim 5, wherein the machine-readable instructions, when executed, cause the machine to identify the uniform resource identifier by extracting the uniform resource identifier from the first communication session initiation message.

7. A storage device as defined in claim 5, wherein the first communication session initiation message comprises a session initiation protocol INVITE message.

8. A storage device as defined in claim 5, wherein the method further comprises:
   comparing the domain name to a list of domain names associated with the global identity service to determine whether the uniform resource identifier is associated with the global identity service; and using the domain name of the uniform resource identifier to establish a communication session when the domain name is not found in the list of domain names associated with the global identity service.

9. An apparatus, comprising:
a memory storing machine readable instructions; and
a processor to execute the instructions to perform operations comprising:
   identifying a uniform resource identifier associated with a called party, the called party being identified in a received first communication session initiation message, wherein identifying the uniform resource identifier comprises extracting a telephone number from the first communication session initiation message and querying a telephone number mapping database based on the telephone number to obtain the uniform resource identifier;
   identifying a domain name of the uniform resource identifier;
   when the domain name of the uniform resource identifier corresponds to a global identity service and does not specify a service provider network, querying a global uniform resource identifier database based on the uniform resource identifier to identify a first service provider network of the called party according to the global identity service, wherein querying the global uniform resource identifier database comprises sending a query identifying the uniform resource identifier to a global uniform resource identifier server and receiving a response from the global uniform resource identifier server identifying the service provider network; and
   sending a second communication session initiation message including the uniform resource identifier to the first service provider network.

* * * * *